Feb. 9, 1960　　　L. W. BROOKS　　　2,924,058
ROTARY LAWN MOWER CUTTER ASSEMBLY
Filed Dec. 17, 1956　　　　　　　　　　2 Sheets-Sheet 1
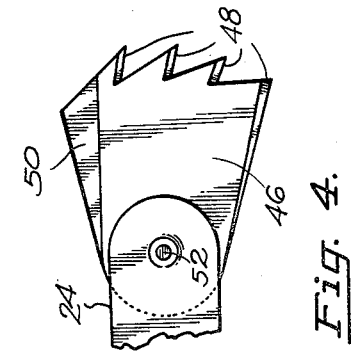
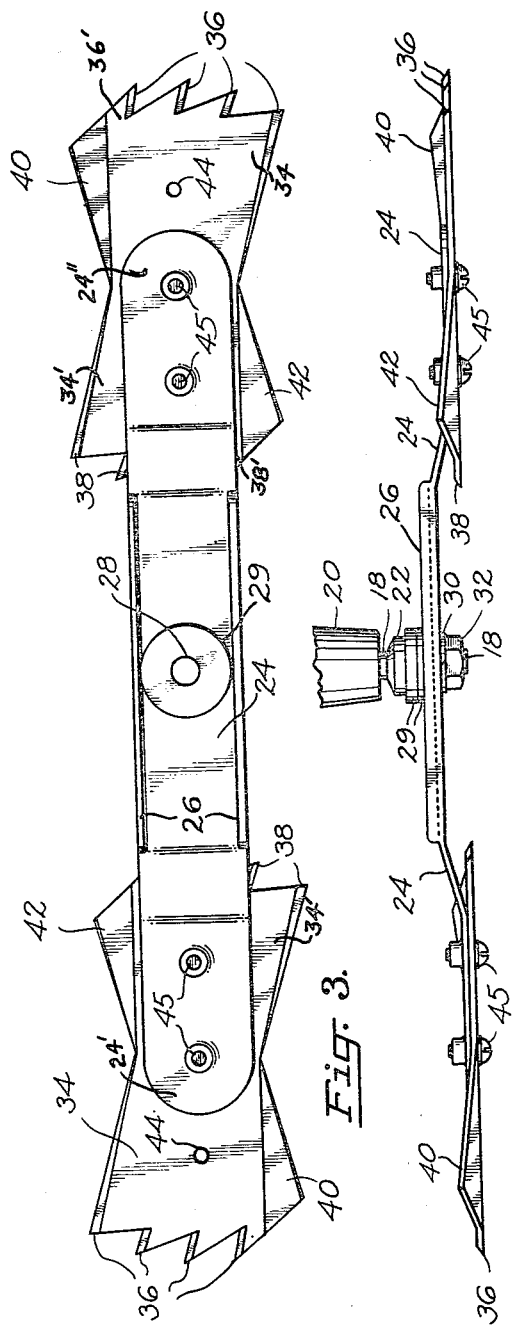
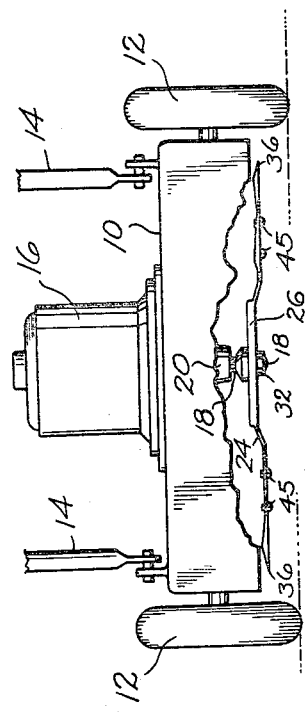
INVENTOR.
Linzy W. Brooks
BY
Eugene S. Farley
Atty.

INVENTOR.
Linzy W. Brooks

United States Patent Office 2,924,058
Patented Feb. 9, 1960

2,924,058

ROTARY LAWN MOWER CUTTER ASSEMBLY

Linzy W. Brooks, Portland, Oreg., assignor of one-half to Eugene D. Farley, Portland, Oreg.

Application December 17, 1956, Serial No. 628,664

1 Claim. (Cl. 56—295)

This invention relates to cutters for lawn mowers of the rotary type in which the cutter is rotated in a plane horizontal to the ground.

Among the principal objects of the present invention are the provision of a cutter for rotary lawn mowers:

(1) Which is attachable to substantially all of the conventional mowers of this class;

(2) Which cuts grass to a uniform height even though it may be wet and heavy;

(3) Which may be used efficiently to cut long grass and heavy weed growth;

(4) Which operates at idling speed of the power unit with the result that there is less fuel consumption, less vibration, less noise, and longer power unit life;

(5) Which may be operated with either rigid or centrifugal blades;

(6) Which carries built-in spare blades for use as required;

(7) Which mulches the cut grass efficiently;

(8) Which is easily adjustable to various heights;

(9) Which does not clog readily.

The manner in which the foregoing and other objects of this invention are accomplished will be apparent from the accompanying specification and claims considered together with the drawings, wherein:

Fig. 1 is a view in front elevation, partly broken away, illustrating the herein described lawn mower cutter attached to the shaft of a conventional rotary lawn mower;

Fig. 2 is an enlarged view in elevation of the cutter illustrated in Fig. 1;

Fig. 3 is a plan view of the cutter of Figs. 1 and 2;

Fig. 4 is a detail, fragmentary view illustrating an alternate type of blade which may be employed in the cutter assembly of Figs. 1–3.

Figure 5:
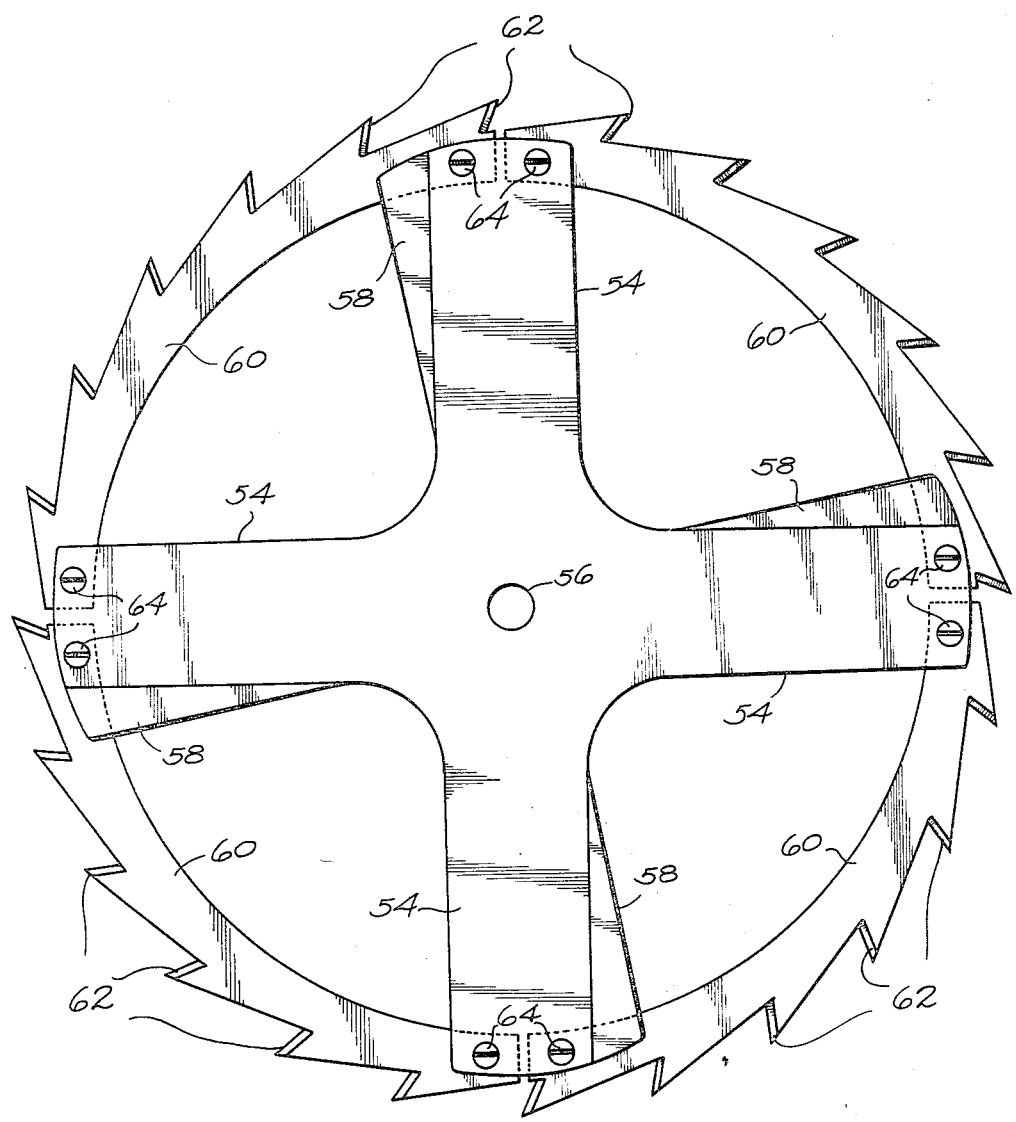
Fig. 5 is still another alternate form of blade which may be employed in the herein described lawn mower cutter.

Generally stated the lawn mower cutter assembly of my invention comprises a cutter bar, means for attaching the shaft of a rotary lawn mower to the cutter bar at substantially its midpoint, and a plurality of teeth disposed on the end of the cutter bar on an arc which is substantially concentric with the shaft.

An upwardly directed flange may be provided on the trailing edge of the bar for creating a turbulence which assists in mulching the cut grass. The teeth may, if desired, be formed on a plate which is attachable to the end of the cutter bar, either rigidly or pivotally. In the alternative, they may be formed on a plate which is attachable between the ends of a pair of crossed cutter bars.

Considering the foregoing in greater detail and with particular reference to the drawings:

As is illustrated in Fig. 1, the herein described lawn mower cutter may be attached to a conventional rotary lawn mower 10 mounted on wheels 12 and guided by means of handles 14. The mower includes a gasoline engine or electric motor power unit 16 having a rotatable drive shaft 18. This rotates in sleeve 20 and is provided with an integral flange 22.

The cutter assembly comprises a cutter bar 24 which preferably is bent to form substantially horizontal outer sections which lie on a lower plane than does the central section. The body of the cutter bar is reinforced by suitable means, as by means of the vertical side flanges 26.

Means are provided for attaching the cutter bar substantially at its midpoint to shaft 18. To this end the cutter bar may be formed with a central opening 28 dimensioned to receive shaft 18. To determine the position of the cutter bar on the shaft, and hence its elevation from the ground, one or more washers 29 also may be slipped on the shaft. The assembly then is held removably in place by means of lock washer 30 and nut 32.

The cutting teeth preferably are formed on separate plates which are releasably attachable to the bar. These plates are secured to the bar as substantially linear extensions thereof, and may be either rigidly or pivotally secured thereto depending upon whether or not centrifugal action is desired.

Plates rigidly secured to the bar are illustrated in Figs. 1–3. Two such plates are included, one on each end 24', 24" of the bar. The plates preferably are formed with two rows of teeth on opposite ends and are reversibly mounted so that each plate carries in effect a built-in spare set of teeth. This makes possible prolonged use of the cutter without sharpening it.

A plurality of spaced teeth 36, the leading edges of which are sharpened, are formed at one end 36' of each plate, and a plurality of teeth 38, the leading edges of which are also sharpened, are formed at the other end 38' thereof. The trailing side edges of each half 34, 34' of the plate are bent upwardly to form flanges 40, 42 respectively. These create an air turbulence as the cutter rotates, and promote efficient mulching of the material.

The plates thus are constructed symmetrically and may be mounted on cutter bar 24 in such a manner that one or the other of the two sets of teeth may be used for cutting as desired. To this end, each plate is provided with three spaced perforations, one of which is indicated at 44, arranged in line along the longitudinal axis of the plate. The extremity of cutter bar 24 is formed with a pair of openings which correspond in spacing to those on the plate. Accordingly the plate may be fastened to the cutter bar in one position by means of bolts 45 and then rotated through 180° and fastened in a second position when it is desired to use the other set of teeth.

Where it is desired to mount the cutting plate pivotally on cutter bar 24, the construction illustrated in Fig. 4 may be employed. In this case also plate 46 is formed with a plurality of spaced teeth 48. The leading edges of the teeth are sharpened and they are arranged in an arc, the center of which is shaft 18. An upwardly directed flange 50 is present on the trailing side edge of the plate for creating air turbulence in the manner described above.

Plate 46 is pivotally attached to arm 24 by means of bolt 52. It swings freely but, when the bar is rotated, assumes through centrifugal action a position such that it becomes a substantially linear extension of the bar. Then in the event that a rigid object is struck, the plate can move angularly, which may prevent damage to the plate or to the teeth.

Still another embodiment of the invention is illustrated in Fig. 5. In this form of the invention two arms 54 crossed preferably at right angles to each other, or the illustrated equivalent construction wherein the arms are formed integrally from a single piece of material, are employed. At their point of intersection, the arms are provided with an opening 56 dimensioned to receive shaft 18 of the mower. Hence the arms may be mounted on the mower in the same manner as described above. The trailing side edge of each of the arms is formed with an upwardly directed flange 53 which, like flanges 42, 50 of the previously described embodiments serves the function of creating air turbulence.

The plates bearing the cutting teeth are formed, preferably, as segments 60, each of which forms a quarter of a circle. This has several advantages. First, in the event of breakage only the broken segment need be replaced. Second, the segments are sharpened easily. Third, substantially less metal is required than if the entire assembly were to be formed out of a single sheet of tool steel.

Each segment is formed with a plurality of spaced teeth 62 provided with sharpened leading cutting edges. The ends of each segment are perforated, as are the ends of arms 54, so that the segments may be attached releasably to the arms by means of bolts 64. Four of the segments may be attached to the arms to form a complete cutting circle, as illustrated.

Thus it will be apparent that by the present invention I have provided a cutter for rotary lawn mowers which provides a plurality of cutting teeth all of which are positioned in such a manner that they cut the grass with equal efficiency. This is for the reason that they are disposed on an arc of which the motor shaft is the center.

As a result, the efficiency of the cutting operation is markedly improved so that the motor may be run at idling speed with less fuel consumption, less vibration, less noise and longer life. The grass is cut more uniformly even though it is wet and heavy. Efficient mulching is obtained. Clogging of the blades is reduced to a minimum. Sharpening and replacement are facilitated. All of these advantages are obtained, furthermore, using a cutter assembly which is rugged, simple and inexpensive to make, and attachable to the great majority of conventional rotary lawn mowers.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A cutter for a rotary lawn mower having a power driven rotary shaft, said cutter comprising an elongated cutter bar, attaching means on the cutter bar for attaching the latter to the rotary shaft, an elongated cutter plate having a plurality of teeth on each of its opposite longitudinal ends, securing means releasably and reversibly securing the cutter plate to an end of the cutter bar with one of said toothed ends projecting longitudinally outward from said end of the cutter bar and the remaining length of the cutter plate extending longitudinally inward from said end of the cutter bar and a pair of upwardly directed flanges on the cutter plate, one connected to the trailing edge of the outwardly projecting end of the plate and inclined upwardly in the trailing direction, and the other connected to the leading edge of the inwardly extending end of the plate and inclined upwardly in the leading direction, the teeth on the opposite ends of the plate being arranged on an arc of which the attaching means is the center.

References Cited in the file of this patent

UNITED STATES PATENTS

| | | |
|---|---|---|
| 299,142 | Hilton | May 27, 1884 |
| 1,336,257 | Muzzy | Apr. 6, 1920 |
| 2,471,367 | Cavaness | May 24, 1949 |
| 2,547,540 | Roberts | Apr. 3, 1951 |
| 2,576,884 | Leigh | Nov. 27, 1951 |
| 2,578,880 | Doyle | Dec. 18, 1951 |
| 2,592,755 | Soenksen | Apr. 15, 1952 |
| 2,625,784 | Kelsey | Jan. 20, 1953 |
| 2,645,010 | Holmes | July 14, 1953 |
| 2,651,159 | Rountree | Sept. 8, 1953 |
| 2,663,984 | Clark | Dec. 29, 1953 |
| 2,721,432 | Machovec | Oct. 25, 1955 |
| 2,728,182 | Fulton et al. | Dec. 27, 1955 |